United States Patent [19]

Ookubo et al.

[11] Patent Number: 4,641,890
[45] Date of Patent: * Feb. 10, 1987

[54] WHEEL COVER FOR A VEHICLE

[75] Inventors: Takao Ookubo, Yokohama; Yuko Baba, Tokyo; Kiyoshi Kamihama, Yokohama, all of Japan

[73] Assignees: Nissan Motor Company, Ltd.; Hashimoto Forming Kogyo Co., Ltd., both of Tokyo, Japan

[*] Notice: The portion of the term of this patent subsequent to Oct. 26, 1999 has been disclaimed.

[21] Appl. No.: 703,469

[22] Filed: Feb. 22, 1985

Related U.S. Application Data

[63] Continuation of Ser. No. 605,992, May 2, 1984, abandoned, which is a continuation of Ser. No. 402,567, Jul. 25, 1982, abandoned, which is a continuation of Ser. No. 155,927, Jun. 3, 1980, abandoned.

[30] Foreign Application Priority Data

Jun. 4, 1979 [JP] Japan .................................. 54-68844

[51] Int. Cl.⁴ ............................................ B60B 7/00
[52] U.S. Cl. .................................. 301/37 SS; 301/37 P
[58] Field of Search ............... 301/37 R, 37 SS, 37 P, 301/63 PW, 65, 37 L; 29/159 A; 012/204, 205; 249/56, 60

[56] References Cited

U.S. PATENT DOCUMENTS

| D. 85,574 | 11/1931 | Davenport | D12/205 |
|---|---|---|---|
| D. 166,863 | 5/1952 | McLeod | D12/205 |
| D. 167,801 | 9/1952 | McLeod | D12/205 |
| D. 167,802 | 9/1952 | McLeod | D12/205 |
| 2,699,361 | 1/1955 | Jenkins, Jr. . | |
| 2,699,361 | 1/1955 | Jenkins . | |
| 2,709,114 | 5/1955 | Plotkin . | |
| 2,713,516 | 7/1955 | Lyon . | |
| 2,725,258 | 11/1955 | Lyon . | |
| 2,847,096 | 8/1958 | Lyon . | |
| 2,847,252 | 8/1958 | Lyon . | |
| 2,928,694 | 3/1960 | Lyon, Jr. . | |
| 3,145,059 | 8/1964 | Hemstreet . | |
| 3,145,062 | 8/1964 | Judd . | |
| 3,178,231 | 4/1965 | Hezler, Jr. . | |
| 3,333,900 | 8/1967 | Aske, Jr. . | |
| 3,397,920 | 8/1968 | Aske, Jr. et al. . | |
| 3,549,205 | 12/1970 | Reid . | |
| 3,726,566 | 4/1973 | Beith . | |
| 3,876,257 | 4/1975 | Buerger . | |
| 3,989,306 | 11/1976 | Buerger | 301/37 SS |
| 4,009,911 | 3/1977 | Apczynski . | |
| 4,166,653 | 9/1979 | Clauchery . | |
| 4,275,930 | 6/1981 | Kamihama | 301/37 R |
| 4,355,848 | 10/1982 | Ookubo et al. | 301/37 SS |
| 4,364,608 | 12/1982 | Ookubo et al. | 301/37 SS |

FOREIGN PATENT DOCUMENTS

| 1666359 | 11/1953 | Fed. Rep. of Germany . |
|---|---|---|
| 2717469 | 10/1978 | Fed. Rep. of Germany . |
| 1118590 | 6/1956 | France . |
| 2329458 | 5/1977 | France . |
| 18-19861 | 8/1943 | Japan . |
| 596284 | 12/1947 | United Kingdom . |
| 724584 | 2/1955 | United Kingdom . |
| 791632 | 3/1958 | United Kingdom . |
| 1186316 | 4/1970 | United Kingdom . |
| 1287567 | 8/1972 | United Kingdom . |
| 1380796 | 1/1975 | United Kingdom . |
| 1465464 | 2/1977 | United Kingdom . |
| 2013590 | 8/1979 | United Kingdom . |

OTHER PUBLICATIONS

Frommer, "Handbuch der Spritzgusstechnik" (Handbook of Injection Molding Technology), Springer Publishers, Berlin (1933), pp. 135–138.

Primary Examiner—H. Grant Skagg
Attorney, Agent, or Firm—Schwartz, Jeffery, Schwaab, Mack, Blumenthal & Evans

[57] ABSTRACT

A wheel cover (1) for a vehicle includes outer and an inner peripheral portions (2, 3) and a plurality of spoke portions (4) connecting the outer and inner peripheral portions with each other. The outer and inner peripheral portions and the spoke portions are integrally formed into a one-piece structure. Longitudinal center lines (e, f) of the spoke portions cross each other, in front view, at the cross points (Q) which are radially outward beyond the inner peripheral surface (2a) of the outer peripheral portion (2) and/or at the cross points (P) which are radially inward beyond the outer peripheral surface (3a) of the inner peripheral portion (3).

21 Claims, 9 Drawing Figures

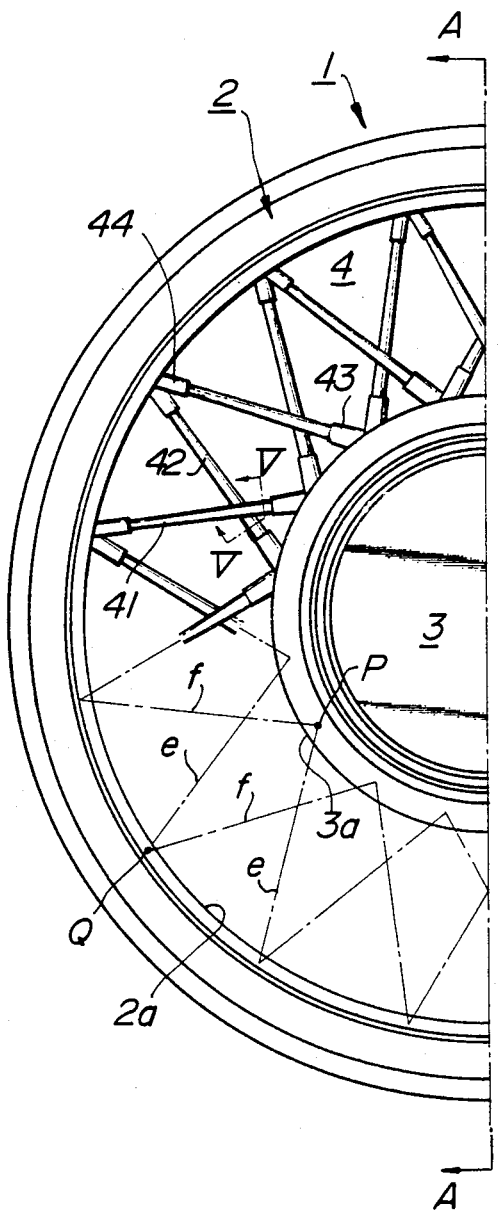
FIG_1
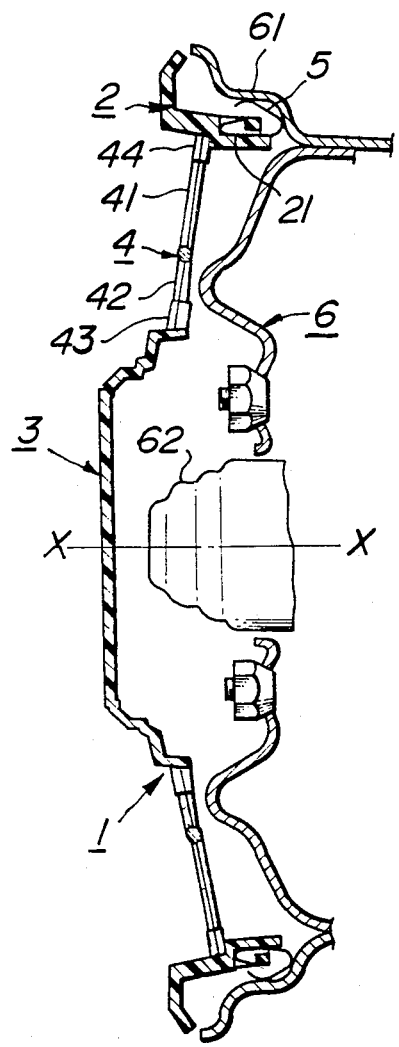
FIG_2

FIG_3A
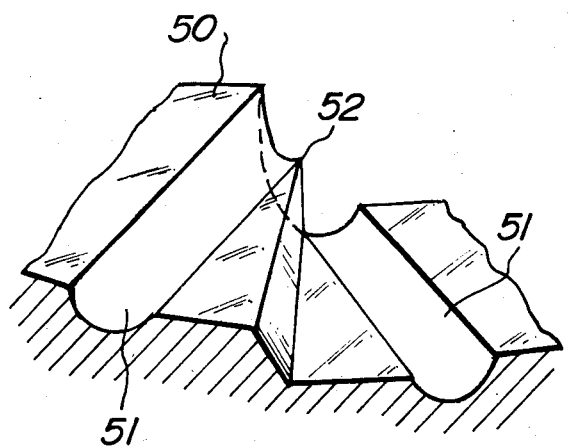
FIG_3B
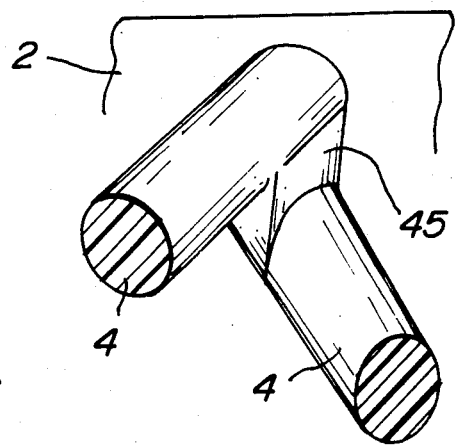
FIG_4A
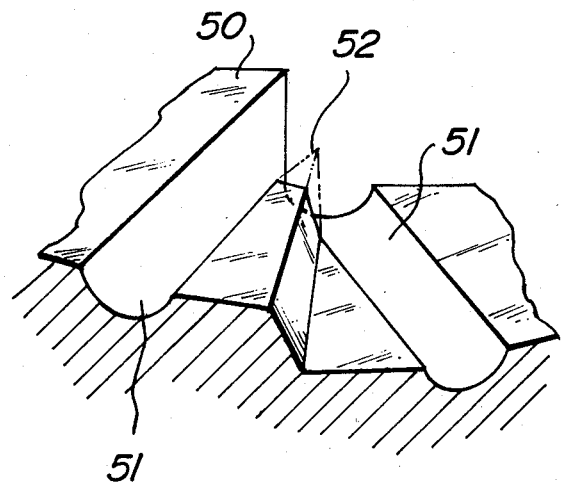
FIG_4B
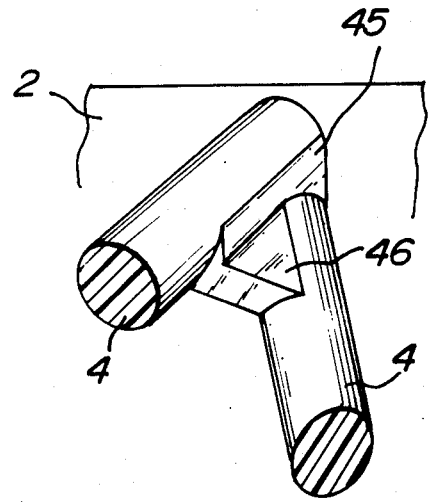

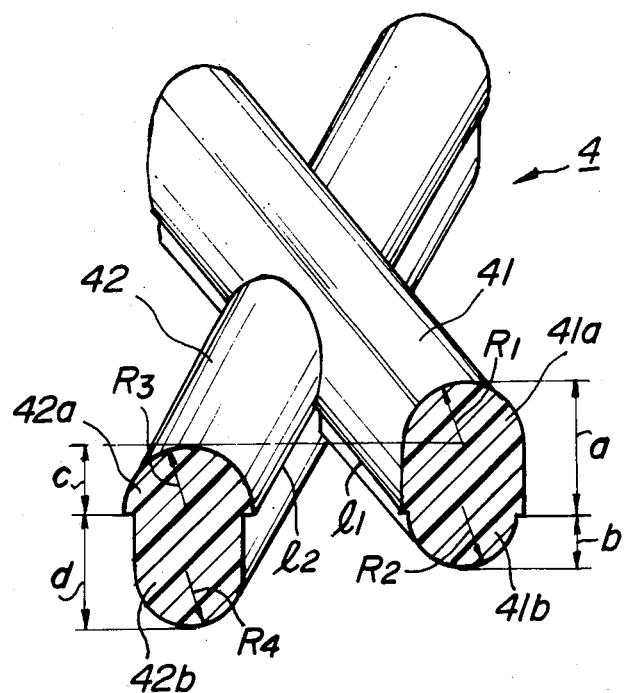
FIG.5
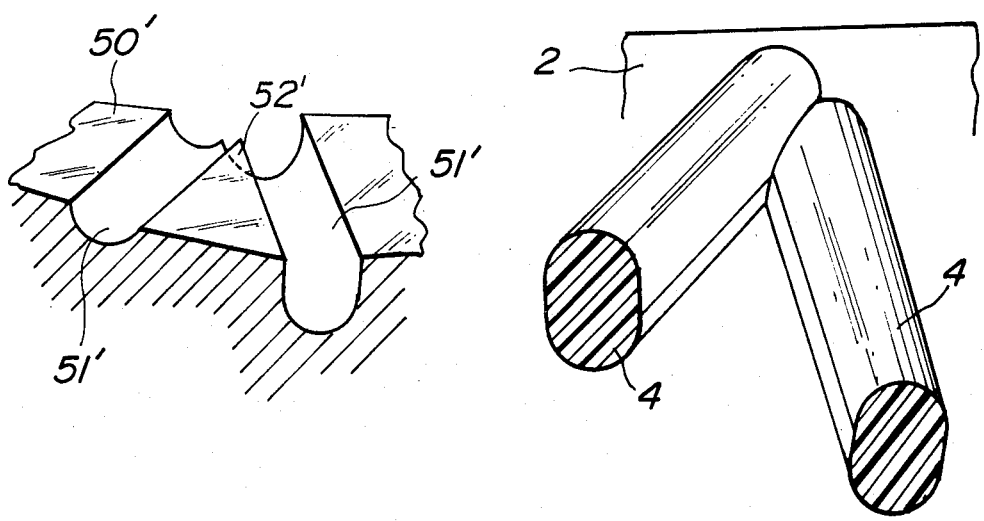
FIG.6A
FIG.6B

WHEEL COVER FOR A VEHICLE

This application is a continuation of co-pending application Ser. No. 605,992 filed May 2, 1984, and now abandoned, which in turn was a continuation of therewith co-pending application Ser. No. 402,567 filed July 28, 1982, and now abandoned, which in turn was a continuation of therewith co-pending application Ser. No. 155,927 filed June 3, 1980, and now abandoned.

BACKGROUND OF THE INVENTION

The present invention relates to a wheel cover for a vehicle including radially outer and inner peripheral portions and a plurality of spoke portions located between and connected to the outer and inner peripheral portions.

A conventional wheel cover of the type mentioned above includes separate outer and inner peripheral portions and spokes which are made of metal wire, e.g. stainless steel wire, and the spokes are assembled one by one to connect the outer and inner peripheral portions with each other. Such a wheel cover necessitates a number of parts and hence a substantial number of steps and cost for the manufacture. Further, the spokes tend to loosen due to vibration and shocks during driving of the vehicle, which causes undesirable rattling of the wheel cover.

The above mentioned disadvantages can be eliminated by a wheel cover in which the outer and inner peripheral portions and the spoke portions are integrally formed into a one-piece structure. Such a wheel cover can be manufactured by injection moulding of suitable plastic material, or casting or die-casting of suitable light metal alloy, so that the assembling cost can be greatly reduced and the loosening of the spokes and the rattling of the wheel cover can be completely eliminated.

In such a wheel cover, the spoke portions may not extend precisely radially outwards from the outer peripheral portion. Namely, adjacent spoke portions may cross each other at cross points generally at the connection of the spoke portions with the outer and inner peripheral portions, respectively. However, when the cross point of the longitudinal center lines in the front view are aligned at the opposing surfaces of the outer and inner peripheral portions, especially at the inner periphery of the outer peripheral portion where the spoke portions cross each other at a narrower angle, flat portions are formed between the spoke portions which are crossed with each other. Thus, the impression of actually assembled separate spokes is not obtained so that the appearance of the wheel cover is greatly marred.

SUMMARY OF THE INVENTION

An object of the present invention is to provide an improved wheel cover which provides an impression of actually assembled separate spokes, particularly at the cross points of the spoke portions, and is adapted to be manufactured by moulds or dies which can be easily manufactured and has a superior durability and operability.

According to the present invention, there is provided a wheel cover for a vehicle, comprising an annular radially outer peripheral portion, a disc-like or annular radially inner peripheral portion and a plurality of spoke portions located between and connected to the outer and inner peripheral portions, said outer and inner peripheral portions and said spoke portions being integrally formed into a one-piece structure, the longitudinal center lines of two adjacent spoke portions crossing each other, in front view, at a cross point which is radially outwardly beyond the inner peripheral surface of the outer peripheral portion and/or at a cross point which is radially inwardly beyond the outer peripheral surface of the inner peripheral portion.

Thus, the moulds used to form the wheel cover of the present invention can be easily manufactured, and the undesirable flat portions are not produced near the cross points of the spoke portions so that the appearance of the wheel cover is greatly improved. Further, the parting surface between the upper and lower moulds may be in a common even plane, so that the mould can be easily aligned or separated.

Other features and advantages of the present invention will become apparent with reference to the following detailed description of the preferred embodiments, by way of example, shown in the attached drawings.

BRIEF DESCRIPTION OF THE DRAWINGS

FIG. 1 is a plan view of a wheel cover according to the present invention;

FIG. 2 is a sectional view taken along line A—A of FIG. 1;

FIG. 3A is a perspective view of a portion of a mould at the location corresponding to the connection between the outer peripheral portion and the spoke portions;

FIG. 3B is a perspective view of a portion of the wheel cover made by the mould shown in FIG. 3A;

FIG. 4A is a perspective view of a portion of a mould which is modified from the mould shown in FIG. 3A;

FIG. 4B is a perspective view of a portion of the wheel cover made by the mould shown in FIG. 4A;

FIG. 5 is an enlarged part-sectional perspective view of a portion of the wheel cover taken along the line V—V of FIG. 1;

FIG. 6A is a perspective view of a portion of a mould, according to the present invention, corresponding to the moulds shown in FIGS. 3A and 4A; and FIG. 6B is a perspective view of a portion of the wheel cover shown in FIG. 1 made by the mould shown in FIG. 6A.

DETAILED DESCRIPTION OF THE PREFERRED EMBODIMENTS

Referring to FIGS. 1 and 2, reference numeral 1 designates a wheel cover according to a prefered embodiment of the present invention. The wheel cover 1 comprises an annular radially outer peripheral portion 2, a disc-like radially inner peripheral portion 3 which is spaced radially inward from the outer peripheral portion 2, and a number of spoke portions 4 which connect the outer and inner peripheral portions with each other. The outer and inner peripheral portions 2 and 3 and the spoke portions 4 are integrally formed, e.g. by injection moulding of suitable plastic material or casting or die-casting of suitable light metal or light metal alloy.

The outer peripheral portion 2 has on the rear surface an integrally formed annular clip mount 21 which extends rearward coaxially with the center axis X—X of the wheel cover 1. A plurality of clips 5 made of resilient material are mounted on the outer peripheral surface of the clip mount 21 and resiliently engage with a rim 61 of a wheel disc 6. The inner peripheral portion 3 projects frontward to form a shallow dish to accommodate a hub 62 of the wheel disc 6. Instead, the inner peripheral portion 3 may be of annular shape.

As shown in FIG. 1, when seen from the front, the spoke portions 4 cross each other near the inner periphery of the outer peripheral portion 2, near the outer periphery of the inner peripheral portion 3, and at a point between the outer and inner peripheral portions, at these cross points, the spoke portions are staggered or offset in the axial direction which is in parallel with the center axis X—X of the wheel cover 1.

At the cross points of the spoke portions near the outer and inner peripheral portions 2 and 3, when the spoke portions 4 are arranged in the staggered relation to provide a solid impression of actual spokes and to improve the appearance of the wheel cover, a flat portion 45 as shown in FIG. 3B is inevitably formed between the staggered spoke portions as the wheel cover 1 is injection moulded, so that the appearance is marred. A portion of a mould 50 by which such a flat portion 45 is formed is shown in FIG. 3A. The mould 50 has cavities 51 and 51 which form the staggered spoke portions 4 and 4 shown in FIG. 3B. A sharp edge 52 defines the cross point with the flat portion 45. Further, the parting surface between the upper and lower moulds is not even. Thus, it is relatively difficult to manufacture and accurately align the moulds. Moreover, the durability of the moulds is not sufficient.

The mould 50 shown in FIG. 3A may be modified, as shown in FIG. 4A, to eliminate the sharp edge 52 so as to avoid the above-mentioned disadvantages relating to the manufacture and durability of the mould. Staggered spoke portions 4 made by the modified mould are shown in FIG. 4B. As shown, the eliminated portion of the mould 50 corresponding to the sharp edge forms another flat portion 46 so that the appearance is further marred.

The present invention aims to eliminate the above mentioned flat portions 45 and 46 to improve the appearance of the injection moulded wheel cover, by an improved mould which can be easily manufactured and has a sufficient durability.

According to the present invention, the cross points P between the center lines e and f of the spoke portions 4 are positioned radially inward from the outer periphery of the inner peripheral portion 3, and the cross points Q between the center lines e and f of the spoke portions 4 are positioned radially outward from the inner periphery of the outer peripheral portion 2.

As shown in FIG. 5, the spoke portions 4 cross each other at the above-mentioned third cross points between the outer and inner peripheral portions 2 and 3 in integral and staggered relation in the direction parallel with the center axis X—X of the wheel cover 1. As to the cross sectional shape of the spoke portions 4, each spoke portion is formed by an axial front section and a rear section. More particularly, the front side spoke portion 41 is formed by a front section 41a of generally inverted U-shape, and a rear section 41b of generally semi-circular shape. The rear side spoke portion 42 is formed by a front section 42a of generally semi-circular shape and a rear section 42b of generally U-shape.

In FIG. 5, $R_1$ and $R_2$ represent radii of the front section 41a and the rear section 41b of the front side spoke portion 41, and $R_3$ and $R_4$ radii of the front section 42a and the rear section 42b of the rear side spoke portion 42, respectively. Then, the radii are such that $R_1 > R_2$ and $R_3 > R_4$. In other words, the width of the front section 41a is wider than that of the rear section 41b, and the width of the front section 42a is wider than that of the rear section 42b. Thus, fins which may be formed along the parting lines between the cavity and core of injection mould are not visible from outside and the alignment error between the cavity and core is absorbed so that the mould can be easily manufactured. Further, as shown in FIG. 1, each spoke portion 41 and 42 appears to be a round rod in the front elevation so that the appearance is not at all marred.

As shown in FIG. 5, the thickness a of the front section 41a is more than the thickness b of the rear section 41b as to the front side spoke portion 41, and the thickness d of the rear section 42b is more than the thickness c of the front section 42a as to the rear side spoke portion 42. Also as shown in FIG. 5, the thickness a of the front section 41a of spoke portion 41 is greater than the thickness c of the front section 42a of spoke portion 42, and the thickness b of the rear section 41b of spoke portion 41 is less than the thickness d of the rear section 42b of spoke portion 42. Each thickness a, b, c or d is determined such that the border lines $l_1$ between the front and rear sections 41a and 41b of the front side spoke portion 41, as well as the border lines $l_2$ between the front and rear sections 42a and 42b of the rear side spoke portion 42 are on one common plane. Also, a plane including the center of the radius $R_1$ of the front section 41a of the front side spoke portion 41 coincides with or passes slightly front side of a plane which includes the top edge of the rear side spoke portion 42.

As shown in FIG. 1, both side edges of the front side spoke portions 41 are straight lines in the front view without any constriction at the cross points. Further, the parting surface between the cavity and core of the injection mould is the above-mentioned plane which is even so that the mould can be easily manufactured and aligned.

A portion of the mould 50' is shown in FIG. 6A, which corresponds to the connection between the spoke portions 4 and the inner and outer peripheral portions 3 and 2. As shown, the parting surface is one even plane, and the sharp edge 52' between the cavities 51' and 51' is relatively small. This is due to the fact that the cross points Q of the center lines of the spoke portions 4 and positioned radially outward from the inner peripheral surface of the outer peripheral portion 2, as stated above. FIG. 6B shows a connection between the spoke portions 4 and 4 and the outer peripheral portion 2 which are injection moulded by the mould 50' shown in FIG. 6A. As shown in FIG. 6B, flat surfaces, such as the surface 45 and/or 46 are not formed by the mould 50' near the cross points P and Q. Also, as shown in FIG. 6B, the width of the front section of each spoke resembling member may be the same as teh width of the rear section.

It will be appreciated that the wheel cover 1 according to the present invention is formed integrally by moulding with the outer and inner peripheral portions 2 and 3 and the spoke portions 4, and has a refined appearance without bothersome and unnatural flat portions. Also, the mould used to manufacture such a wheel cover can be easily manufactured and has a superior durability and operability.

What is claimed is:

1. A wheel cover for a vehicle, comprising: an annular radially outer peripheral portion, a disc-like or annular radially inner portion, and a plurality of spoke portions located between and connected to the outer peripheral and inner portions, said outer peripheral and inner portions and said spoke portions being an integrally molded one-piece structure, and means for attaching said one-piece structure to a vehicle road wheel, each spoke portion being formed by a spoke-resembling member and having a front section on an outer surface side and a rear section on an inner surface side, the width of the front section being greater than the width of the rear section, each spoke portion crossing with an adjacent first spoke portion at a first cross point between said outer peripheral and inner portions, said two spoke portions being staggered at the first cross point in axial direction of the wheel cover, with the front section of the spoke portion lying in front at said first cross point being thicker than its rear section, and the front section of the spoke portion lying behind at said first cross point being thinner than its rear section, boundary lines between said front and rear sections of both spoke portions being in a common plane, and, as seen in front view, each spoke portion having its longitudinal center line crossing with that of an adjacent second spoke portion at a second cross point which is in the vicinity of, and radially outwards of the outer peripheral surface of the outer peripheral portion, and each spoke portion having its longitudinal center line crossing with that of an adjacent third spoke portion at a third cross point which is in the vicinity of, and radially inwards of the outer peripheral surface of the inner portion.

2. A wheel cover as claimed in claim 1, wherein the thickness of said front section of at least the front side spoke-resembling members decreases radially outwardly from said inner to the outer peripheral portion.

3. A wheel cover for a vehicle wheel, comprising:
a one-piece member integrally molded in a mold having a parting surface, said member comprising an annular radially outer portion, a radially inner portion having a circular outer counter and a plurality of spoke portions each having a solid cross-section and extending between and connected to said radially outer and radially inner portions, each spoke portion crossing with another spoke portion at a cross point between said radially outer and radially inner portions and each two crossing spoke portions being staggered at said cross point in the axial direction of said wheel cover, each spoke portion having a front section on an outer surface side and a rear section on an inner surface side, with the front section of the spoke portion lying in front at said cross point being thicker than the front section of the spoke portion lying behind at said cross point, boundary lines between said front and rear sections of each two crossing spoke portions being defined by the parting surface of the mold in which said member is molded and lying substantially in a common plane; and
means for attaching said wheel cover to a vehicle wheel.

4. A wheel cover as claimed in claim 3, wherin the width of the front sections of each spoke portion is substantially the same as the width of its rear section.

5. A wheel cover as claimed in claim 4, wherein the front section of the spoke portion lying in front at each cross point is thicker than its rear section.

6. A wheel cover as claimed in claim 3, wherein the front section of the spoke portion lying in front at each cross point is thicker than its rear section.

7. A wheel cover as claimed in claim 6, wherein the front section of the spoke portion lying behind at each cross point is thinner than its rear section.

8. A wheel cover as claimed in claim 7, wherein the rear section of the spoke portion lying in front at said cross point is thinner than the rear section of the spoke portion lying behind at said cross point.

9. A wheel cover for a vehicle wheel, comprising:
a one-piece member integrally molded in a mold having a parting surface, said member comprising an annular radially outer portion, a radially inner portion having a circular outer contour and a plurality of spoke portions each having a solid cross-section and extending between and connected to said radially outer and radially inner portions, each spoke portion crossing with another spoke portion at a cross point between said radially outer and radially inner portions and each two crossing spoke portions being staggered at said cross point in the axial direction of the wheel cover, each spoke portion having a front section on an outer surface side and a rear section on an inner surface side, with the front section of the spoke portion lying in front at said cross point being thicker than its rear section, boundary lines between said front and said rear sections of each two crossing spoke portions being defined by the parting surface of the mold in which said member is molded and lying substantially in a common plane; and
means for attaching said wheel cover to a vehicle wheel.

10. A wheel cover as claimed in claim 9, wherein the width of the front section of each spoke portion is substantially the same as the width of its rear section.

11. A wheel cover as claimed in claim 10, wherein the front section of the spoke portion lying behind at each cross point is thinner than its rear section.

12. A wheel cover as claimed in claim 9, wherein the front section of the spoke portion lying behind at each cross point is thinner than its rear section.

13. A wheel cover as claimed in claim 9, wherein the rear section of the spoke portion lying in front at said cross point is thinner than the rear section of the spoke portion lying behind at said cross point.

14. A wheel cover for a vehicle wheel, comprising:
a one-piece member integrally molded in a mold having a parting surface, said member comprising an annular radially outer portion, a radially inner portion having a circular outer contour and a plurality of spoke portions each having a solid cross-section and extending between and connected to said radially outer and radially inner portions, each spoke portion crossing with another spoke portion at a cross point between said radially outer and radially inner portions and each two crossing spoke portions being staggered at said cross point in the axial direction of the wheel cover, each spoke portion having a front section on an outer surface side and a rear section on an inner surface side with the front section of the spoke portion lying behind at each cross point being thinner than its rear section, boundary lines between said front and rear sections of each two crossing spoke portions being defined by the parting surface of the mold in which said member is molded and lying substantially in a common plane; and
means for attaching said wheel cover to a vehicle 15. A wheel cover as claimed in claim 14, wherein the width of the front section of each spoke portion is substantially the same as the width of its rear section.

16. A wheel cover as claimed in claim 14, wherein the rear section of the spoke portion lying in front at said cross point is thinner than the rear section of the spoke portion lying behind at said cross point.

17. A wheel cover for a vehicle wheel, comprising:
an integrally molded one-piece member comprising an annular radially outer portion, a radially inner portion having a circular outer contour and a plurality of spoke portions extending between and connected to said radially outer and radially inner portions, each spoke portion crossing with another spoke portion at a cross point between said radially outer and radially inner portions and each two crossing spoke portions being staggered at said cross point in the axial direction of the wheel cover, each spoke portion having a front section on an outer surface side and a rear section on an inner surface side, the width of the front section of each spoke portion being greater than the width of its rear section, and boundary lines between said front and rear sections of each two crossing spoke portions being substantially in a common plane; and
means for attaching said wheel cover to a vehicle wheel.

18. A wheel cover as claimed in claim 17, wherein the front section of the spoke portion lying in front at each cross point is thicker than the front section of the spoke portion lying behind at said cross point.

19. A wheel cover as claimed in claim 18, wherein the front section of the spoke portion lying in front at each cross point is thicker than its rear section.

20. A wheel cover as claimed in claim 17, wherein the front section of the spoke portion lying in front at each cross point is thicker than its rear section.

21. A wheel cover as claimed in claim 17, wherein the front section of the spoke portion lying in behind at each cross point is thinner than its rear section.

* * * * *

UNITED STATES PATENT AND TRADEMARK OFFICE
CERTIFICATE OF CORRECTION

PATENT NO. : 4,641,890

DATED : February 10, 1987

INVENTOR(S) : Takao OOKUBO, Yuko BABA and Kiyoshi KAMIHAMA

It is certified that error appears in the above—identified patent and that said Letters Patent is hereby corrected as shown below:

In the Title Page, Item [63] (Related Data), line 3,
"25, 1982" should read -- 28, 1982 --;

Item [73] (Assignees), line 3, should read -- both of Yokohama, Japan --;

Item [57] (Abstract), line 1, "an" should be deleted.

Column 2, line 1, "ahd" should read -- and --;
line 51, "prefered" should read -- preferred --.

Column 3, line 8, after "portions" the comma "," should be a period -- . --;
line 9, "at" should read -- At --.

Column 4, line 45, "and" should read -- are --;
line 54, "teh" should read -- the --.

Claim 3, line 5, "counter" should read -- contour --.

UNITED STATES PATENT AND TRADEMARK OFFICE
CERTIFICATE OF CORRECTION

PATENT NO. : 4,641,890
DATED : February 10, 1987
INVENTOR(S) : Takao OOKUBO, Yuko BABA and Kiyoshi KAMIHAMA It is certified that error appears in the above—identified patent and that said Letters Patent is hereby corrected as shown below:

Claim 4, line 1, "wherin" should read -- wherein --;
      line 2, "sections" should read -- section --.

Claim 14, line 23, after "vehicle" there should be inserted
      -- wheel. --.

Claim 21, line 2, "in" should be deleted.

Signed and Sealed this

Twenty-fifth Day of August, 1987

Attest:

DONALD J. QUIGG

Attesting Officer     Commissioner of Patents and Trademarks